July 13, 1965 R. T. ADAMS ETAL 3,195,048

TIME DIVERSITY COMMUNICATION SYSTEM

Filed June 4, 1962 2 Sheets-Sheet 1

INVENTORS.
ROBERT T. ADAMS
BY KAREL J. STALLER
Alfred C. Hill
AGENT

July 13, 1965 R. T. ADAMS ETAL 3,195,048

TIME DIVERSITY COMMUNICATION SYSTEM

Filed June 4, 1962 2 Sheets-Sheet 2

INVENTORS.
ROBERT T. ADAMS
BY KAREL J. STALLER
Alfred C. Hill
AGENT

United States Patent Office 3,195,048
Patented July 13, 1965

3,195,048

TIME DIVERSITY COMMUNICATION SYSTEM

Robert T. Adams, Short Hills, and Karel J. Staller, Rutherford, N.J., assignors to International Telephone and Telegraph Corporation, Nutley, N.J., a corporation of Maryland Filed June 4, 1962, Ser. No. 199,896
17 Claims. (Cl. 325—56)

This invention relates to communication systems and more particularly to diversity communication systems.

One of the difficulties encountered in radio communication systems is that of fading. Communication systems, line-of-sight or scatter types, are subject to both long term fading (independent of frequency) caused by changes in the propagation medium and to selective or short term fading resulting from multipath propagation. Selective fading causes the suppression of frequency segments in the baseband of the transmitted signals. This type of fading can be detrimental to all types of information communication systems and particularly to those communication systems where the information is conveyed by code pulse signals, such as digital data signals and telegraph signals, where pulse code groups represent a character of the message being conveyed. The suppression of one or more characters could change the meaning of a word or even the whole message. It is obvious that such errors or alteration of the message cannot be tolerated in such communication systems.

Fading in radio communication systems can be compensated for by utilizing diversity type communication systems. In such communication systems various techniques are employed to provide a plurality of signal paths so that the signals following these paths are substantially uncorrelated with respect to fading, that is the signals on the different paths will not fade simultaneously. In the past the plurality of uncorrelated signal paths have been provided by employing space, frequency and angle diversity techniques, and the like.

An object of the present invention is to provide still another diversity arrangement to provide substantially uncorrelated signal paths.

Another object of this invention is to provide a time diversity communication system for transmitting individual messages or multiplexed group of messages, for instance, telegraph messages, overcoming the effects of fading and in particular selective fading.

A feature of this invention is the provision of means to provide two identical information signals, one delayed a predetermined time with respect to the other, means to propagate the two signals through a transmission medium, means coupled to the output of the transmission medium to render the two signals time coincident, and means utilizing the time coincident signals to compensate for fading in the transmission medium.

Another feature of this invention is the provision of a delay device at the receiving terminal of the communication system to provide the predetermined time spacing between the two signals having a sufficient magnitude to render the two signals substantially uncorrelated with respect to fading and a delay device at the receiving terminal of the communication system having a time delay equal to the predetermined time to render the two signals time coincident.

Still another feature of this invention is the provision of a storage device to provide the time delay device at both ends of the communication system including a magnetic drum rotating at a predetermined speed having write-in and read-out heads spaced about the periphery of the drum a predetermined amount, the time delay of the storage device being determined by the spacing of the write-in and read-out heads and the speed of revolution of the magnetic drum.

A feature of this invention is an arrangement to synchronize and stabilize the revolution of the magnetic drums at each end of the communication system including a synchronous driving motor to drive each magnetic drum energized from a common alternating current (A.C.) power supply, the A.C. power for the synchronous motor at the receiving terminal being transmitted over a third signal path in the transmission medium. A rotor including spaced magnets on the periphery thereof included as a portion of the driving train between the synchronous motor and the magnetic drum has its rotation inductively controlled by a standard frequency source, such as a tuning fork arrangement, to stabilize the revolution of the magnetic drum to prevent variation in the A.C. power supply from changing the time delay and, hence, reduce the effectiveness of the system in compensating for fading.

Still a further feature of this invention is an arrangement to maintain the gap between the write-in and read-out heads and the surface of the magnetic drum constant including either an eccentric associated with each of said heads or an arrangement including springs and air pressure to compensate for changes in the gap space between the heads and the surface of the magnetic drum.

The above-mentioned and other features and objects of this invention will become more apparent by reference to the following description taken in conjunction with the accompanying drawings, in which.

Figure 1:
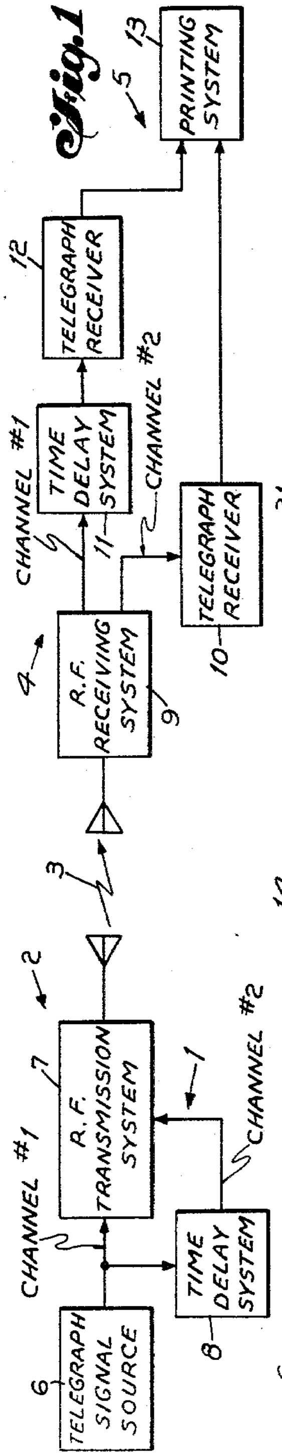
FIG. 1 is a schematic diagram in block form of a diversity communication system in accordance with the principles of this invention.

The description to follow and the illustration in the drawings are concerned with telegraph signals but it is to be understood that this specific reference to information signals is for the purpose of explanation and is not meant to limit the signal with which the diversity system of this invention will operate. It is to be understood that the diversity communication system described herein, while it has particular advantage in those communication systems conveying information by means of code signals, will overcome the effect of fading, and particularly selective fading, for any information signal source.

Referring to FIG. 1, there is illustrated therein a time diversity system including means 1 to provide two identical information signals, one delayed with respect to the other by a predetermined time of sufficient magnitude to render the two signals uncorrelated with respect to fading. Means 2 propagates the two signal outputs of means 1 through a transmission medium 3 to means 4 which operates to render the two signals of means 1 time coincident.

The output of means 4 is coupled to means 5 to utilize the time coincident signals to compensate for fading in medium 3.

The fading compensation is provided by the fact that if at one instant of time one of the signals fade, the other signal will not fade due to the uncorrelated relationship of the two signals. Hence, at means 5 the two signals may be compared and the signal not subject to the fading condition can be utilized to fill in that portion of the information lost in the signal subject to the fading condition.

More particularly, the system of FIG. 1 is illustrated as including a source of telegraph signals 6 which may be either a telegraph key or perforated tape commonly associated with automatic telegraph systems. The output of source 6 is coupled directly to a radio frequency transmission system 7 and over a separate path including time delay system 8 to transmission system 7. The time delay provided by system 8 is sufficient to render the two signals coupled to system 7 uncorrelated with respect to fading. These two signals coupled to system 7 are maintained separated, thereby effectively providing two communication paths through medium 3, by means of transmitting each of the signals on a different frequency, transmitting the two signals on orthogonally related polarized waves, or any other such arrangement to maintain the two signals generated in the transmitting terminal of the system separated while being propagated through medium 3. The radio frequency receiving system 9 receives the transmitted signals from medium 3 in a manner to be compatible with the type of transmission arrangement present in system 7. In other words, if the two signals are separated in frequency, receiving system 9 would be capable of accepting and maintaining these two signals separated. If the two signals were radiated on orthogonally polarized waves, receiving system 9 would be able to accept these orthogonally related waves and maintain the two signals separate and distinct. Thus, at the output of system 9 are the two signals coupled to the input of system 7. The signal which was time delayed by system 8 is coupled directly from system 9 to a telegraph receiver 10 while the signal which was coupled directly to system 7 from source 6 is coupled to time delay system 11 to delay this signal an amount equal to the time delay of system 8, thereby placing the two signals in the receiving terminal of the system in time coincidence. The output signal of system 11 is coupled to telegraph receiver 12. The output signals from receivers 10 and 12 are coupled to means 5 illustrated in FIG. 1 to the printing system 13 capable of recording the output signals of receivers 10 and 12 independently and separate from each other. Such a printing system could be a dual channel printer. By examining the printed record of the two signals it is possible to employ one signal to fill in the gaps present in the other signal caused by this latter signal experiencing a fading phenomena.

Figure 2:
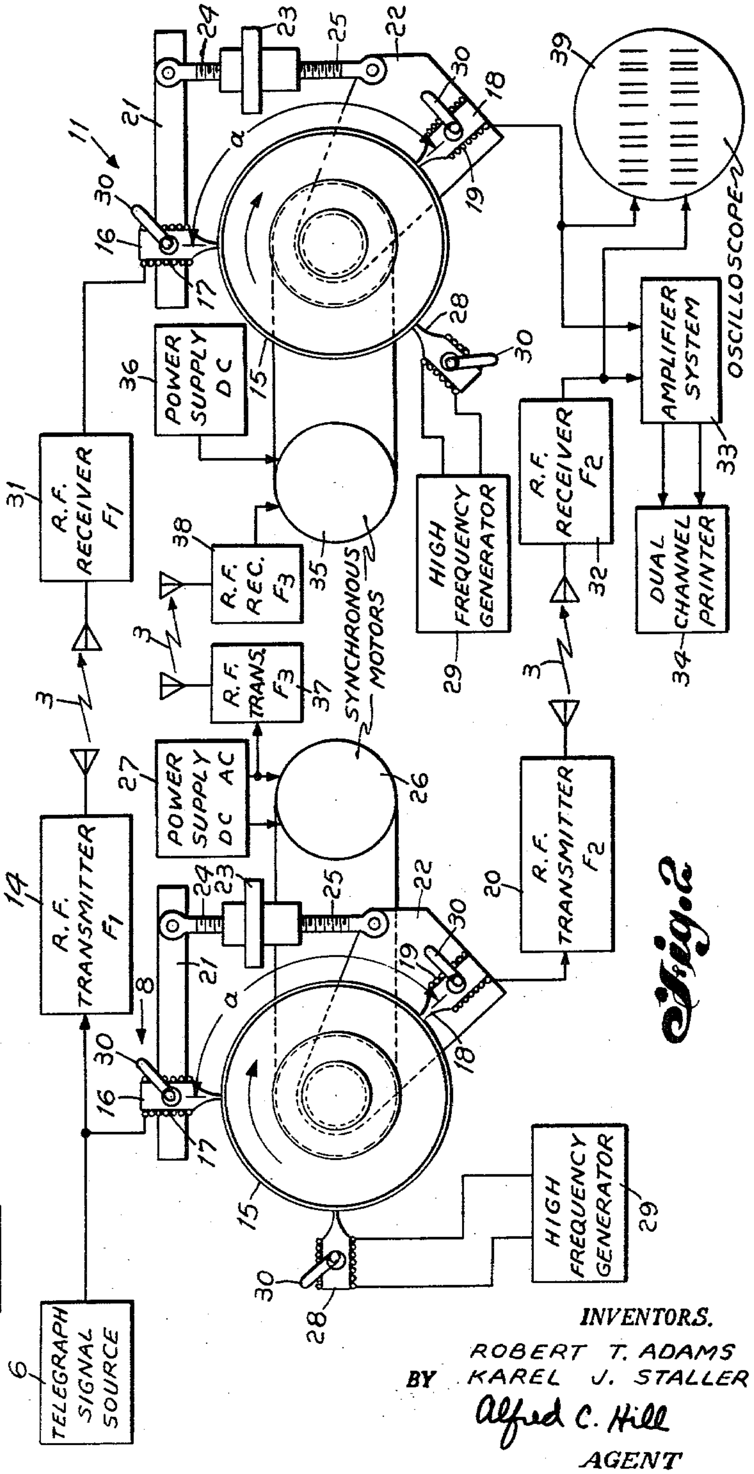
FIG. 2 is a schematic diagram in block form illustrating an embodiment of the diversity system of FIG. 1.

Referring to FIG. 2, there is illustrated therein in more detail certain components of the system described in connection with FIG. 1 and illustrating one specific arrangement for maintaining the two timed spaced signals separate and distinct one from the other, in other word, a specific arrangement to maintain two signal paths through the communication system from one terminal to the other. As in FIG. 1, telegraph signals of source 6 are coupled directly to radio frequency transmitter 14 operating at a given carrier frequency F1 and to time delay system 8. System 8 is illustrated to include a storage device in the form of magnetic recording drum 15 and write-in head 16 including coil 17 coupled to source 6 for the purpose of writing the signals of source 6 on the surface of drum 15. The signals written on the surface of drum 15 are stored thereon and due to the rotation of drum 15 eventually will come under read-out head 18. Head 18 will remove the stored signals from drum 15 and apply them to coil 19 of read-out head 18 for application to radio frequency transmitter 20 operating at a carrier frequency F2 different from the carrier frequency of the transmitter 14. The difference between the carrier frequencies of transmitters 14 and 20 need only be sufficient to ensure no cross-talk between the two signals, the frequency spacing of two carriers need not be that which would normally be required in a frequency diversity system.

To provide the desired time delay it is necessary to provide a predetermined angular spacing *a* between write-in head 16 and read-out head 18 and also to rotate drum 15 at a predetermined constant speed. The angular spacing between write-in head 16 and read-out head 18 is accomplished by securing head 16 to a fixed member 21, securing head 18 to member 22 which is rotatable about the central axis of drum 15, and interconnecting members 21 and 22 by means of a micrometer 23 having left and right threads engaging rods 24 and 25 pivotally secured respectively to members 21 and 22. Thus, through this arrangement angle *a* may be varied and, hence, the magnitude of the delay with a constant rotation of drum 15. The rotation of drum 15 is provided by synchronous motor 26 receiving its direct current (D.C.) and alternating current (A.C.) voltages from power supply 27.

To enable drum 15 to continuously delay the signals emitted from source 6, it is necessary to erase the information stored in drum 15 by head 16. This is accomplished by employing an erase head 28 receiving its erasing current from high frequency generator 29.

It is important in providing a constant unvariable time delay through the use of drum 15 that the gap between both heads 16 and 18 and the surface of drum 15 be maintained constant. This can be accomplished by employing eccentrics 30 operatively secured to each of the heads 16, 18, and 28.

The signals present at transmitters 14 and 20 are transmitted over transmission medium 3 and received from medium 3 by receivers 31 and 32 tuned to operate at the carrier frequency of their associated transmitter. The signal received by receiver 32 is coupled directly to an amplifier system 33 and, hence, to dual channel printer 34. The signal received by receiver 31 is coupled to time delay system 11 in the form of a storage device identical with the storage device described with reference to system 8 at the transmitting terminal. Thus, the signal is coupled to coil 17 of write-in head 16 for storage on drum 15. This stored signal in time is removed from drum 15 by read-out head 18. The signal present in coil 19 of read-out head 18 is then coupled to amplifier 33 and, hence, to printer 34. As set forth in the description of the storage device employed in system 8 of the transmitting terminal, the time delay is determined by the angular spacing between write-in head 16 and read-out head 18, the angle *a*, and the speed of rotation of drum 15. As before, the angular displacement of heads 16 and 18 can be adjusted by the arrangement including members 21 and 22 interconnected by the micrometer screw 23 and rods 24 and 25. Drum 15 is rotated by a synchronous motor 35 which may receive its D.C. power from a local power supply 36 but to ensure that drums 15 at both ends of the system are driven at the same speed of rotation, in other words, to ensure that the rotation of the drums are synchronized, motor 35 receives its A.C. power from source 27 by means of transmitter 37 and receiver 38 operating at a third carrier frequency different than the carrier frequencies employed to propagate the main signals through medium 3. Thus, due to the behavior of synchronous motors which have their speed synchronized according to the frequency of the A.C. voltage applied thereto, synchronous motors 26 and 35 will rotate at the same speed since they receive their A.C. power from the same source. Thus, with the same angular spacing of heads 16 and 18 and with drums 15 being rotated at the same speed, the time delay at both ends of the system will be the same, and hence, the signals coupled to amplifier 33 and, hence, to printer 34 will be in time coincidence and will thereby permit compensation of fading that may interrupt or mutilate a portion of one of the received signals.

As in the case of the delay device in the transmitting terminal, an erase head 28 driven by generator 29 is employed to erase the information stored in drum 15 after this information has been read out of drum 15. Also eccentrics 30 employed in conjunction with each of the heads associated with drum 15 will maintain the gap between the heads and surface of the drum constant.

It is possible to employ an oscilloscope 39 to compare the two signals coupled to amplifier system 33 to monitor the phase relationship and, in other words, the time coincident relationship between the two signals. If the two signals are not exactly in phase the time delay at the receiving terminal can be corrected utilizing micrometer screw 23. It has been found that successful fade compensation can be obtained with the system of FIG. 2 if the time delay imparted to the signals at both ends of the system is one second. This can be accomplished by making angle $a$ equal to 144° and by rotating drum 15 at a speed of 24 revolutions per minute.

Figure 3:
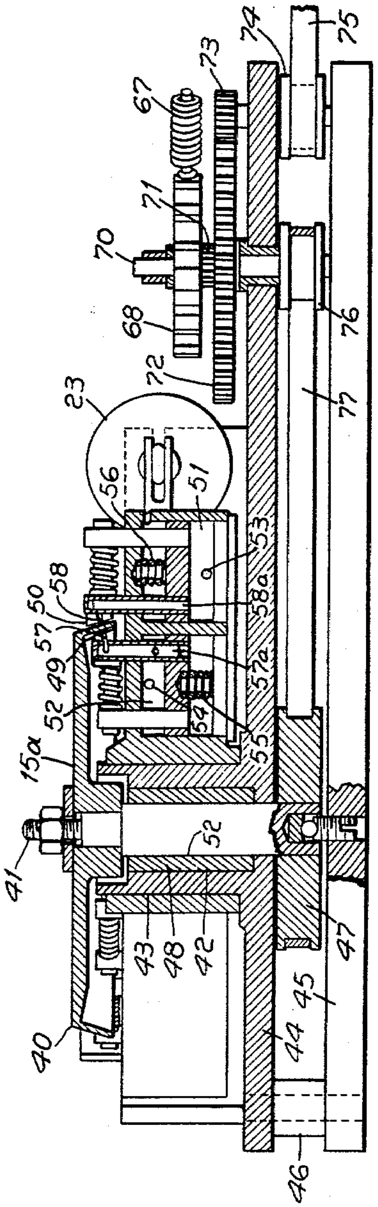
FIG. 3 is a cross-sectional view of another embodiment of the storage device providing the time delay for the system of FIG. 1.
Figure 4:
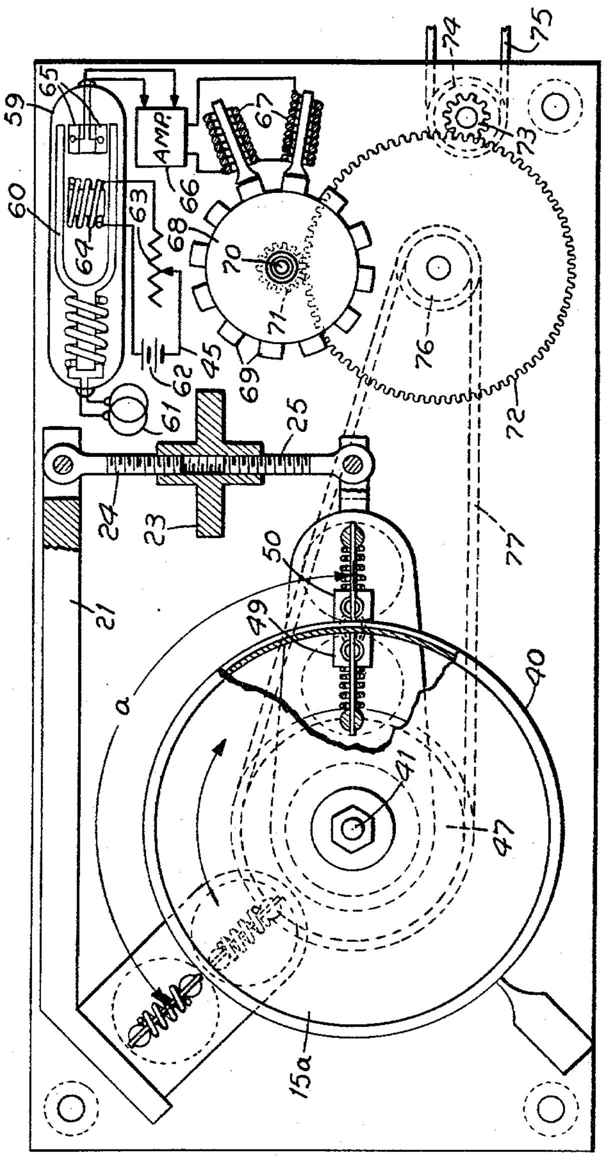
FIG. 4 is a top plan view, partially in section, of the storage device of FIG. 3.

Referring to FIGS. 3 and 4, another embodiment of the time delay system employed at both the transmitting and receiving terminals of the communication system is illustrated. The magnetic drum 15*a* is illustrated as including a thin wall 40 having a frusto-conical shape. Drum 15*a* is secured to shaft 41 which extends through an aperture 42 in member 43 extending vertically from support member 44 and, hence, to base 45. Support member 44 and base member 45 are separated a predetermined distance by separators 46 to provide sufficient room therebetween for positioning pulley 47 secured to shaft 41. Shaft 41 rotates in an aluminum oxide sleeve 48 providing low and constant friction to facilitate the control of a constant rotation speed for drum 15*a*.

Both the write-in head and read-out head will have the same construction as described hereinbelow for the read-out head illustrated in FIG. 3. The read-out head is in the form of electromagnets 49 and 50 each having flat faces parallel to opposite surfaces of wall 40. To maintain the distance between the surfaces of wall 40 and the faces of electromagnets 49 and 50 constant, air pressure is emitted into two cylinders 51 and 52 through apertures 53 and 54 from an exact pressure equalizer (not illustrated). The air pressure in cylinders 51 and 52 is in equilibrium with the forces of springs 55 and 56. The faces of electromagnets 49 and 50 are provided with two small apertures 57 and 58 in communication with cylinders 51 and 52 through means of channels 57*a* and 58*a*. Air escapes through the apertures at a rate corresponding to the actual gap between wall 40 and the heads of electromagnets 49 and 50. If one or the other gap is too small, pressure of air is increased and springs 55 or 56 are compressed and the gap corrected to the value adjusted by the pressure of air and force of springs 55 and 56.

As in the discussion of the arrangement of FIG. 2, the angular position between the read-in head and the write-out head may be adjusted by micrometer 23.

As mentioned hereinabove, it is required in the operation of the communication system of this invention to maintain the speed of rotation of the magnetic drum at the receiving end in synchronism with the rotation of the drum at the transmitting end of the communication system. It was further pointed out that to a certain degree this synchronization of speed of rotation could be accomplished by employing synchronous motors energized from a common A.C. source. It is well known that the speed of the synchronous motors will vary due to variation in the A.C. voltage frequency and this variation could be different at one end of the system than at the other end.

To provide an accurate control of the speed of rotation of the magnetic drums in both the transmitting and receiving terminals, a stabilizer of drum rotation is provided to operate in connection with the power train driving the drums at each end of the system. This is accomplished as illustrated in FIGS. 3 and 4 by employing a tuning fork arrangement 59 as the source of reference frequency. Arrangement 59 includes a tuning fork 60 mechanically resonant at a predetermined frequency driven by energy received from generator 61. Battery 62 and rheostat 63 in conjunction with the electromagnet 64 provide an adjustment for adjusting the frequency of the tuning fork. Upon vibration the free ends of the tuning fork 60 vary the capacitance between the blades 65 and the ends of the tuning fork 60. The impulses due to the varying capacitance are transmitted and amplified in amplifier 66 to a predetermined value. The pulses of current from amplifier 66 magnetize electromagnets 67 disposed in a predetermined relationship about rotor 68 carrying on the circumference thereof a plurality of equally spaced permanent magnets 69. The rotor 68 is mounted on shaft 70 which carries a gear 71 engaging gear 72. Gear 72 engages gear 73 which receives its motion by means of pulley 74 and belt 75 of elastic material arranged to be easily slidable in pulley 74. Belt 75 receives its motion from the synchronous motor, either motor 26 or motor 35, depending upon the end of the communication system in which the arrangement is employed. Motion delivered by gear 73 to gear 72 is transmitted by means of pulley 76 and belt 77 to gear 47 to drive drum 15*a*.

The stabilization of rotation is accomplished by electromagnets 67 and rotor 68 in the following manner. If rotor 68 increases, that is, becomes greater than the frequency of tuning fork 60, the electromagnet 67 in conjunction with the permanent magnet 69 will slow the rotor 68 to the proper speed, thus causing pulley 76 to rotate at the desired speed. Belt 75 which provided the excessive speed will slip in pulley 74. On the other hand, if rotor 68 decreases in speed below the stabilized speed established by tuning fork 60, the speed of rotor 68 is sped up by the attracting forces of electromagnets 67. Here again the pulley 74 will be traveling at a faster speed than provided by belt 75, again causing a slipping of the belt 75 due to the differential motion of these components.

While we have described above the principles of our invention in connection with specific apparatus, it is to be clearly understood that this description is made only by way of example and not as a limitation to the scope of our invention as set forth in the objects thereof and in the accompanying claims.

We claim:

1. A diversity communication system comprising:
a source of information signal;
a transmission medium;
first means coupled to said source to couple said signal to said medium;
a storage device coupled to said source having a predetermined time delay to couple said signal to said medium;
second means coupled to the output of said medium to dispose said signals of said first means and said storage device in time coincidence; and
third means coupled to said second means to separately record said signals of said first means and said storage device;
said storage device including
a magnetic drum, means to rotate said magnetic drum at a predetermined speed,
a write-in head coupled to said source disposed at a given point on the periphery of said drum to store said signal therein,
a read-out head spaced a predetermined angle from said write-in head on the periphery of said drum to read out said stored signals,
a fixed member to support said write-in head,
a member rotatable about the axis of said drum to support said read-out head, and
means interconnecting said fixed and rotatable members including a micrometer screw to permit the adjustment of said predetermined angle,
said predetermined speed and said predetermined angle determining said predetermined time.

2. A diversity communication system comprising:
a source of information signal;
a transmission medium;
first means coupled to said source to couple said signal to said medium;
a storage device coupled to said source having a predetermined time delay to couple said signal to said medium;
second means coupled to the output of said medium to dispose said signals of said first means and said storage device in time coincidence; and
third means coupled to said second means to separately record said signals of said first means and said storage device;
said storage device including
a magnetic drum,
means to rotate said magnetic drum at a predetermined speed including
means to drive said drum for rotation thereof,
a standard frequency generator including a tuning fork driven to oscillate at a predetermined frequency,
an electromagnetic arrangement coupled to said generator, and
means coupled to said means to drive carrying a plurality of permanent magnets on the periphery thereof in inductive coupling relationship with said electromagnetic arrangement to maintain the rotating speed of said drum at the frequency of said tuning fork,
a write-in head coupled to said source disposed at a given point on the periphery of said drum to store said signal therein, and
a read-out head spaced a predetermined angle from said write-in head on the periphery of said drum to read out said stored signals,
said predetermined speed and said predetermined angle determining said predetermined time.

3. A diversity communication system comprising:
a source of information signal;
a transmission medium;
first means coupled to said source to couple said signal to said medium;
a storage device coupled to said source having a predetermined time delay to couple said signal to said medium;
second means coupled to the output of said medium to dispose said signals of said first means and said storage device in time coincidence; and
third means coupled to said second means to separately record said signals of said first means and said storage device;
said storage device including
a magnetic drum,
means to rotate said magnetic drum at a predetermined speed,
a write-in head coupled to said source disposed at a given point on the periphery of said drum to store said signal therein, and a read-out head spaced a predetermined angle from said write-in head on the periphery of said drum to read out said storage signals,
said predetermined speed and said predetermined angle determining said predetermined time,
the gap between said magnetic drum and said heads being maintained constant by an eccentric connected to each of said heads.

4. A diversity communication system comprising:
a source of information signal;
a transmission medium;
a first means coupled to said source to couple said signal to said medium;
a storage device coupled to said source having a predetermined time delay to couple said signals so said medium;
second means coupled to the output of said medium to dispose said signals of said first means and said storage device in time coincidence; and
third means coupled to said second means to separately record said signals of said first means and said storage means;
said storage device including
a magnetic drum including
a disc supporting therefrom a magnetic recording surface having frusto-conical configuration,
a write-in head coupled to said source disposed at a given point on the periphery of said surface to store said signal therein, and
a read-out head spaced a predetermined angle from said write-in head on the periphery of said surface to read out said stored signals,
said predetermined speed and said predetermined angle determining said predetermined time,
said write-in and read-out heads each including
a pair of magnets disposed on opposite sides of said surface having their faces parallel to said surface,
a pair of cylinders one associated with each of said magnets,
a spring associated with each of said cylinders,
an air input for each of said cylinders,
an air communication channel from each of said cylinders to their associated one of said magnets, and
an opening in the face of each of said magnets in communication with said air channel to maintain the gap between the face of said magnets and said surface constant through the cooperation of the pressure of said air and said springs.

5. A diversity communication system comprising:
a source of information signal;
a transmission medium;
a first means coupled to said source to couple said signals to said medium;
a first storage device coupled to said source having a predetermined time delay to couple said signal to said medium;
a second means to couple said signal of said first storage from the output of said medium;
a second storage device coupled to the output of said medium to dispose said signal of said first means in time coincidence with said signal of said first storage device; and
means coupled in common to said second means and said second storage device to separately record the output signals therefrom;
each of said storage devices including
a magnetic drum,
means to rotate said magnetic drum at a predetermined speed,
a write-in head disposed at a given point on the periphery of said drum to store therein signal coupled thereto, and a read-out head spaced a predetermined angle from said write-in head on the periphery of said drum to read out said stored signal;
a fixed member to support said write-in head,
a member rotable about the axis of said drum to support said read-out head, and
means interconnecting said fixed and rotatable members including a micrometer screw to permit the adjustment of said predetermined angle,
said predetermined speed and said predetermined angle determining said predetermined time.

6. A diversity communication system comprising:
a source of information signal;
a transmission medium;
first means coupled to said source to couple said signal to said medium;
a first storage device coupled to said source having a predetermined time delay to couple said signal to said medium;
a second means to couple said signal of said first storage device from the output of said medium;
a scond storage device coupled to the output of said medium to dispose said signal of said first means in time coincidence with said signal of said first storage device; and
means coupled in common to said second means and said second storage device to separately record the output signals therefrom;
each of said storage devices including
a magnetic drum;
means to rotate said magnetic drum at a predetermined speed including
means to drive said drum for rotation thereof,
a standard frequency generator including a tuning fork driven to oscillate at a predetermined frequency,
an electromagnetic arrangement coupled to said generator, and
means coupled to said means to drive carrying a plurality of permanent magnets on the periphery thereof in inductive coupling relationship with said electromagnetic arrangement to maintain the rotating speed of said drum at the frequency of said tuning fork,
a write-in head disposed at a given point on the periphery of said drum to store therein signal coupled thereto; and
a read-out head spaced a predetermined angle from said write-in head on the periphery of said drum to read out said stored signal;
said predetermined speed and said predetermined angle determining said predetermined time.

7. A diversity communication system comprising:
a source of information signal;
a transmission medium;
first means coupled to said source to couple said signal to said medium;
a first storage device coupled to said source having a predetermined time delay to couple said signal to said medium;
second means to couple said signal of said first storage device from the output of said medium;
a second storage device coupled to the output of said medium to dispose said signal of said first means in time coincidence with said signal of said first storage devcie; and
means coupled in common to said second means and said second storage device to separately record the output signals therefrom;
each of said storage devices including
a magnetic drum,
means to rotate said magnetic drum at a predetermined speed,
a write-in head disposed at a given point on the periphery of said drum to store therein signal coupled thereto, and
a read-out head spaced a predetermined angle from said write-in head on the periphery of said drum to read out said stored signal,
said predetermined speed and said predetermined angle determining said predetermined time,
the gaps between said magnetic drum and said heads being maintained constant by an eccentric connected to each of said heads.

8. A diversity communication system comprising
a source of information signal;
a transmission medium;
a first means coupled to said source to couple said signal to said medium;
a first storage device coupled to said source having a predetermined time delay to couple said signal to said medium;
second means to couple said signal of said first storage device from the output of said medium;
a second storage device coupled to the output of said medium to dispose said signal of said first means in time coincidence with said signal of said first storage device; and
means coupled in common to said second means and said second storage device to separately record the output signals therefrom;
each of said storage devices including
a magnetic drum including
a disc supporting therefrom a magnetic recording surface having frusto-conical configuration,
means to rotate said magnetic drum at a predetermined speed,
a write-in head disposed at a given point on the periphery of said surface to store therein signal coupled thereto, and
a read-out head spaced a predetermined angle from said write-in head on the periphery of said surface to read out said stored signals,
said predetermined speed and said predetermined angle determining said predetermined time,
each of said write-in and read-out heads including
a pair of magnets disposed on opposite sides of said surface having their faces parallel to said surface,
a pair of cylinders one associated with each of said magnets,
a spring associated with each of said cylinders,
an air input for each of said cylinders,
an air communication channel for each of said cylinders to their associated one of said magnets, and
an opening in the face of each of said magnets in communication with said air channel to maintain the gap between the face of said magnets and said surface constant through the cooperation of the pressure of said air and said springs.

9. A diversity communication system comprising
a source of information signal;
a transmission medium;
a first means coupled to said source to couple said signal to said medium;
a first storage device coupled to said source having a predetermined time delay to couple said signal to said medium;
second means to couple said signal of said first storage device from the output of said medium;
a second storage device coupled to the output of said medium to dispose said signal of said first means in time coincidence with said signal of said first storage device; and
means coupled in common to said second means and said second storage device to separately record the output signals therefrom;

each of said storage devices including a magnetic drum, means to rotate said magnetic drum at a predetermined speed, a write-in head disposed at a given point on the periphery of said drum to store therein signal coupled thereto, and a read-out head spaced a predetermined angle from said write-in head on the periphery of said drum to read out said stored signal, said predetermined speed and said predetermined angle determining said predetermined time, said means to rotate at the transmitting end of said system including a first synchronous motor, an alternating current power supply to determine the speed of rotation of said first motor, said means to rotate at the receiving end of said system including a second synchronous motor, and means coupling said second motor to said power supply through said medium for speed synchronization thereof with said first motor.

10. A diversity communication system comprising:

a radio frequency transmission medium;

a first radio frequency transmitter coupled to one end of said medium for transmitting a first radio frequency signal having a first radiation characteristic through said medium;

a first radio frequency receiver coupled to the other end of said medium for receiving only said first radio frequency signal;

a second radio frequency transmitter coupled to said one end of said medium for transmitting a second radio frequency signal having a second radiation characteristic distinct from said first radiation characteristic through said medium;

a second radio frequency receiver coupled to said other end of said medium for receiving only said second radio frequency signal;

said first and second radiation characteristics providing two distinct communication paths through said medium;

a source of information signal;

a first means coupled between said source and said first transmitter to couple said information signal directly to said first transmitter for transmission by said first radio frequency signal to said first receiver;

a second means coupled between said source and said second transmitter to couple said information signal to said second transmitter after a time delay equal to a predetermined time for transmission by said second radio frequency signal to said second receiver;

said predetermined time being sufficient to provide uncorrelated signals with respect to fading in each of said paths;

a third means coupled to the output of said first receiver to time delay said information signal received by said first receiver an amount equal to said predetermined time to produce time coincidence between said information signal at the output of said third means and said received information signal at the output of said second receiver; and a fourth means coupled to the output of said third means and the output of said second receiver to separately utilize said time concident information signals.

11. A system according to claim 10, further comprising means interconnecting said second means and said third means to render said time delay in both said second means and said third means identical including a source of synchronizing information coupled to said second means to cooperate in determining time delay of said second means, a third transmitter coupled between said source of synchronizing information and said one end of said medium for transmitting said synchronizing information through said medium by a third radio frequency signal having a third radiation characteristic distinct from said first and second radiation characteristics, and a third receiver coupled between said other end of said medium and said third means for receiving only said third radio frequency signal and recovering said transmitted synchronizing information to render said time delay of said third means identical to said time delay of said second means.

12. A system according to claim 10, wherein each of said second means and said third means include a time delay device.

13. A system according to claim 12, wherein said time delay devices each include a storage device.

14. A diversity communication system comprising:

a radio frequency transmission medium;

a first radio frequency transmitter coupled to one end of said medium for transmitting a first radio frequency signal at a first frequency through said medium;

a first radio frequency receiver coupled to the other end of said medium for receiving only said first radio frequency signal;

a second radio frequency transmitter coupled to said one end of said medium for transmitting a second radio frequency signal at a second frequency distinct from said first frequency through said medium;

a second radio frequency receiver coupled to said other end of said medium for receiving only said second radio frequency signal;

said first and second frequencies being spaced sufficiently to provide two distinct communication paths through said medium;

a source of information signal;

a first means coupled between said source and said first transmitter to couple said information signal directly to said first transmitter for transmission by said first radio frequency signal to said first receiver;

a second means coupled between said source and said second transmitter to couple said information signal to said second transmitter after a time delay equal to a predetermined time for transmission by said second radio frequency signal to said second receiver;

said predetermined time being sufficient to provide uncorrelated signals with respect to fading in each of said paths;

a third means coupled to the output of said first receiver to time delay said information signal received by said first receiver an amount equal to said predetermined time to produce time coincidence between said information signal at the output of said third means and said received information signal at the output of said second receiver; and a fourth means coupled to the output of said third means and the output of said second receiver to separately utilize said time coincident information signals.

15. A system according to claim 14, further comprising means interconnecting said second means and said third means to render said time delay in both said second means and said third means identical including a source of synchronizing information coupled to said second means to cooperate in determining said time delay of said second means, a third transmitter coupled between said source of synchronizing information and said one end of said medium for transmitting said synchronizing information through said medium by a third radio frequency signal having a third frequency distinct from said first and second frequencies, and a third receiver coupled between said other end of said medium and said third means for receiving only said third radio frequency signal and recovering said transmitted synchronizing information to render said time delay of said third means identical to said time delay of said second means.

16. A system according to claim 14, wherein each of and second means and said third means include a time delay device.

17. A system according to claim 16, wherein said time delay devices each include a storage device.

References Cited by the Examiner

UNITED STATES PATENTS

| | | | |
|---|---|---|---|
| 1,802,736 | 4/31 | Ranger | 178—69 |
| 2,327,956 | 8/43 | Begun | 179—100.2 |
| 2,612,566 | 9/52 | Anderson et al. | 179—100.2 |
| 2,935,604 | 5/60 | Di Toro | 325—42 |
| 2,941,035 | 6/60 | Honolka | 179—100.2 |
| 2,987,614 | 6/61 | Roberts et al. | 325—311 |

DAVID G. REDINBAUGH, *Primary Examiner.*